(12) United States Patent
Swales et al.

(10) Patent No.: US 10,538,238 B2
(45) Date of Patent: *Jan. 21, 2020

(54) HYBRID POWERTRAIN AND MODULAR REAR DRIVE UNIT FOR SAME

(71) Applicant: GM GLOBAL TECHNOLOGY OPERATIONS LLC, Detroit, MI (US)

(72) Inventors: Shawn H. Swales, Canton, MI (US); Joel M. Maguire, Northville, MI (US); Goro Tamai, Bloomfield Hills, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/625,243

(22) Filed: Jun. 16, 2017

(65) Prior Publication Data

US 2017/0282909 A1    Oct. 5, 2017

Related U.S. Application Data

(60) Continuation of application No. 14/818,946, filed on Aug. 5, 2015, now Pat. No. 9,707,956, which is a
(Continued)

(51) Int. Cl.
*B60K 1/00* (2006.01)
*B60K 6/36* (2007.10)
(Continued)

(52) U.S. Cl.
CPC ............. *B60W 20/40* (2013.01); *B60K 6/383* (2013.01); *B60K 6/442* (2013.01); *B60K 6/485* (2013.01); *B60K 6/52* (2013.01); *B60W 10/08* (2013.01); *B60W 10/12* (2013.01); *B60W 10/14* (2013.01); *B60W 20/00* (2013.01); *B60W 20/10* (2013.01); *B60W 20/30* (2013.01); *F16H 48/08* (2013.01); *F16H 57/021* (2013.01); *F16H 57/037* (2013.01); *F16H 57/0415* (2013.01); *F16H 57/0441* (2013.01); *F16H 57/0483* (2013.01); *B60K 2001/003* (2013.01); *B60W 2510/06* (2013.01); *B60W 2510/244* (2013.01);
(Continued)

(58) Field of Classification Search
CPC .......... B60K 6/36; B60K 6/365; B60K 6/405; B60K 17/356; B60K 2001/001
USPC ...................... 180/242, 65.6, 65.7, 65.31, 60
See application file for complete search history.

(56) References Cited

U.S. PATENT DOCUMENTS 6,973,982 B2 * 12/2005 Yoshikawa ............... B60K 1/00
180/65.6
7,255,187 B2 *  8/2007 Bell ......................... B60K 6/26
180/65.25
(Continued)

*Primary Examiner* — Anne Marie M Boehler
(74) *Attorney, Agent, or Firm* — Quinn IP Law

(57) ABSTRACT

A modular rear drive unit for a hybrid vehicle comprises a torque distributing unit, an electric motor-generator, and a gearing arrangement operatively connecting the electric motor-generator with the torque distributing unit. The modular rear drive unit also includes an integrated housing and rear cradle supporting and surrounding the torque distributing unit, the electric motor-generator, and the gearing arrangement. The integrated housing and rear cradle operatively mounts to the vehicle body.

13 Claims, 9 Drawing Sheets

Related U.S. Application Data division of application No. 13/889,770, filed on May 8, 2013, now Pat. No. 9,126,581.

(51) Int. Cl.

| | |
|---|---|
| *B60K 6/405* | (2007.10) |
| *B60K 17/356* | (2006.01) |
| *B60W 20/40* | (2016.01) |
| *B60W 20/00* | (2016.01) |
| *B60W 10/12* | (2012.01) |
| *F16H 48/08* | (2006.01) |
| *B60W 10/08* | (2006.01) |
| *B60W 10/14* | (2012.01) |
| *B60W 20/30* | (2016.01) |
| *B60W 20/10* | (2016.01) |
| *F16H 57/04* | (2010.01) |
| *F16H 57/021* | (2012.01) |
| *F16H 57/037* | (2012.01) |
| *B60K 6/383* | (2007.10) |
| *B60K 6/442* | (2007.10) |
| *B60K 6/485* | (2007.10) |
| *B60K 6/52* | (2007.10) |

(52) U.S. Cl.
CPC . *B60W 2710/021* (2013.01); *B60W 2710/083* (2013.01); *B60W 2710/1005* (2013.01); *B60W 2710/12* (2013.01); *Y02T 10/6226* (2013.01); *Y02T 10/6234* (2013.01); *Y02T 10/6265* (2013.01); *Y10S 903/902* (2013.01); *Y10S 903/93* (2013.01); *Y10T 477/23* (2015.01); *Y10T 477/26* (2015.01)

(56) References Cited

U.S. PATENT DOCUMENTS

| | | | | |
|---|---|---|---|---|
| 8,512,202 | B2* | 8/2013 | Oota | B60K 6/48 |
| | | | | 477/5 |
| 8,522,909 | B2* | 9/2013 | Niina | B60K 1/00 |
| | | | | 180/291 |
| 9,126,581 | B2* | 9/2015 | Swales | B60W 20/00 |
| 9,707,956 | B2* | 7/2017 | Swales | B60W 20/00 |
| 2008/0176707 | A1* | 7/2008 | Yamamoto | B60K 6/387 |
| | | | | 477/5 |
| 2009/0242289 | A1* | 10/2009 | Murty | B60L 58/12 |
| | | | | 180/65.265 |
| 2013/0203543 | A1* | 8/2013 | Sten | F16H 48/36 |
| | | | | 475/150 |
| 2013/0281248 | A1* | 10/2013 | Cha | B60K 17/04 |
| | | | | 475/150 |
| 2014/0117654 | A1* | 5/2014 | Buschjohann | B62D 21/11 |
| | | | | 280/795 |
| 2014/0262675 | A1* | 9/2014 | Sugiyama | F16H 57/0445 |
| | | | | 192/85.01 |
| 2015/0038277 | A1* | 2/2015 | Tamura | B60K 17/356 |
| | | | | 475/150 |
| 2015/0152954 | A1* | 6/2015 | Kajikawa | F16H 57/045 |
| | | | | 475/150 |
| 2015/0224867 | A1* | 8/2015 | Nett | B60K 1/00 |
| | | | | 180/65.25 |
| 2015/0375783 | A1* | 12/2015 | Yamamoto | B60K 1/00 |
| | | | | 180/253 |
| 2016/0082827 | A1* | 3/2016 | Koenig | B62D 21/11 |
| | | | | 180/60 |
| 2018/0001759 | A1* | 1/2018 | Hoffmann | B60K 6/365 |

* cited by examiner

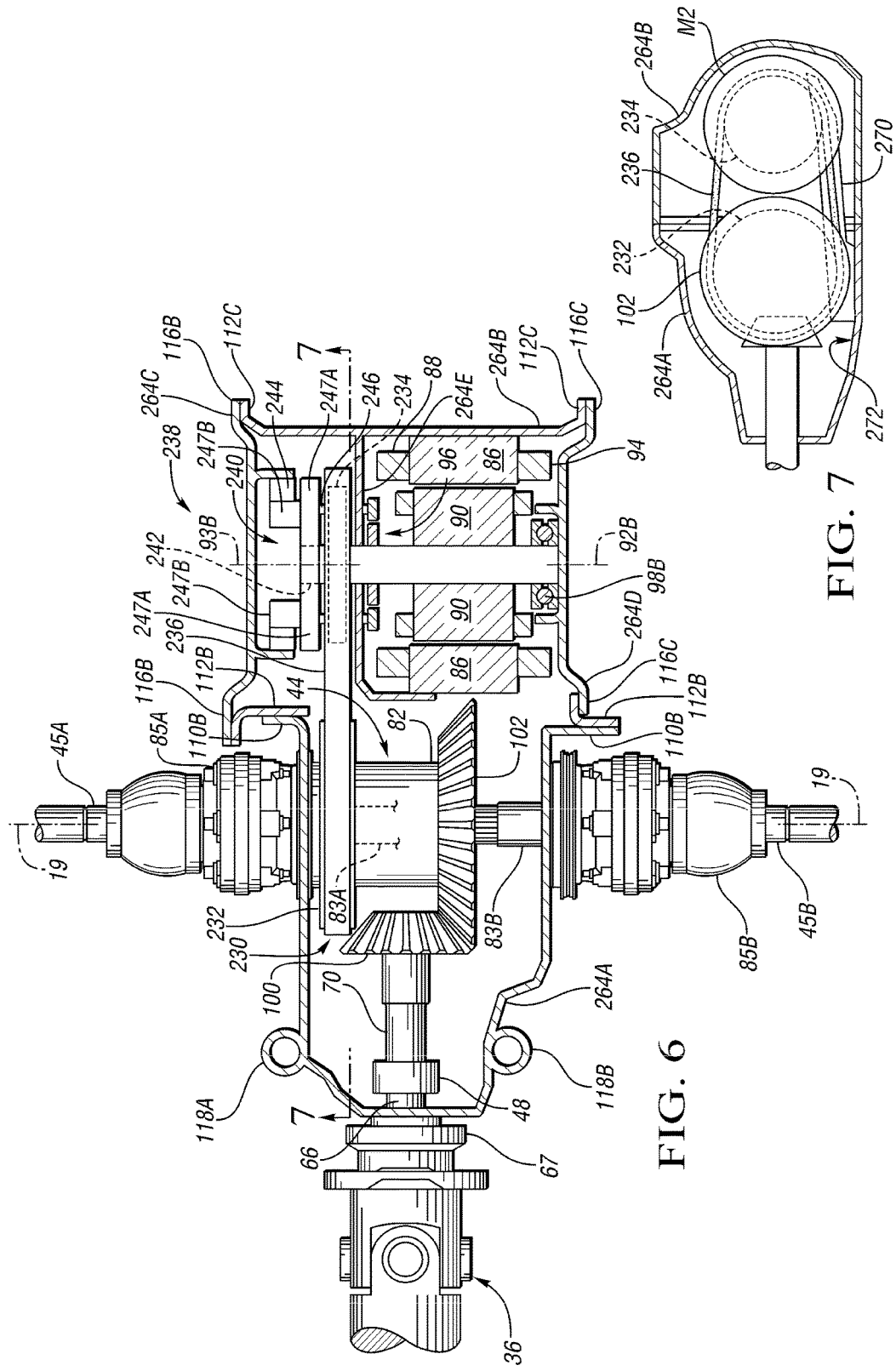

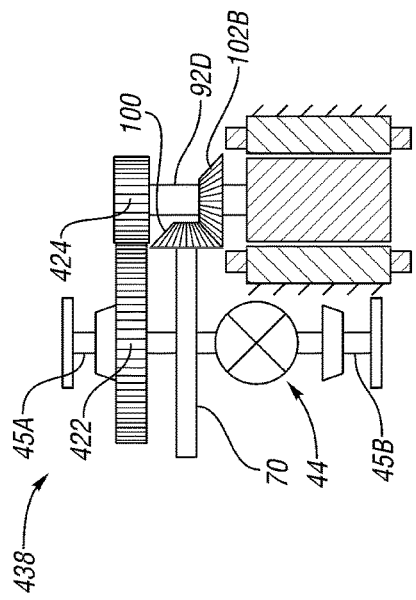
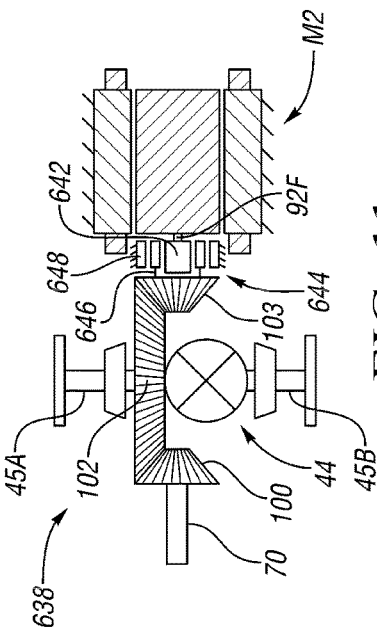
FIG. 8
FIG. 9
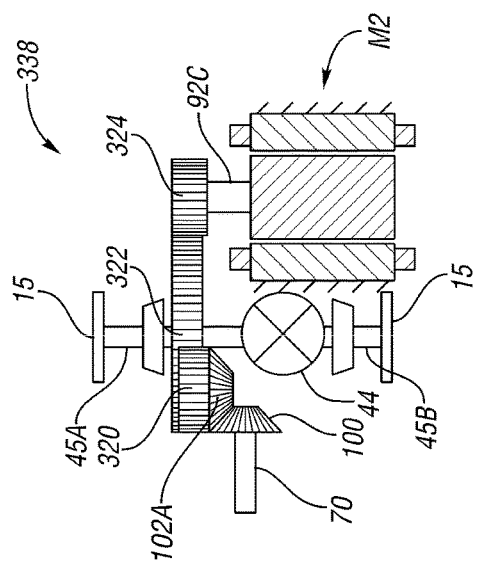
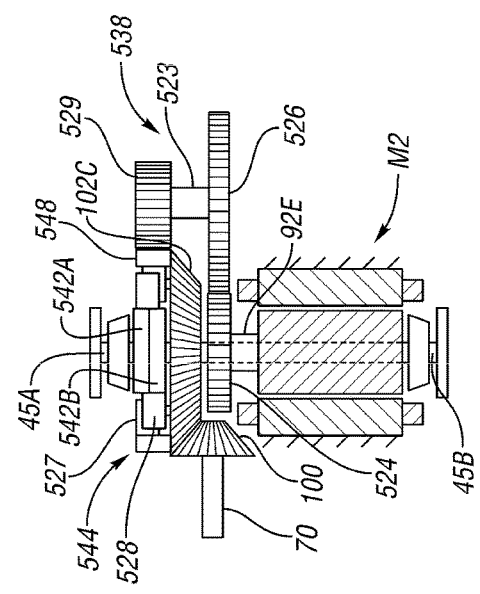
FIG. 10
FIG. 11 ated housing and rear cradle supporting and surrounding the torque distributing unit, the second motor-generator, and the gearing arrangement. The integrated housing and rear cradle directly mounts to the vehicle body.

HYBRID POWERTRAIN AND MODULAR REAR DRIVE UNIT FOR SAME

CROSS-REFERENCE TO RELATED APPLICATIONS

This application is a continuation of U.S. application Ser. No. 14/818,946, filed Aug. 5, 2015, which is a divisional application of U.S. application Ser. No. 13/889,770, filed May 8, 2013, now U.S. Pat. No. 9,126,581, issued Sep. 8, 2015, and both of which are hereby incorporated by reference in their entirety.

TECHNICAL FIELD

The present teachings generally include a hybrid vehicle.

BACKGROUND

Hybrid powertrains for vehicles utilize different power sources under different vehicle operating conditions. For example, a hybrid powertrain with an electrically-variable transmission can have different operating modes established by engaging brakes and/or clutches in different combinations and controlling an engine and motor/generators. A hybrid powertrain can improve fuel economy by allowing the engine to operate at its most fuel efficient speed. However, the additional components required for a hybrid powertrain, such as planetary gear sets, brakes and/or clutches, may increase overall vehicle cost and packaging space requirements.

SUMMARY

A modular rear drive unit is provided for a hybrid powertrain that enables hybrid functionality, and allows adaptation of a conventional rear-wheel drive powertrain layout to the hybrid powertrain described while maintaining much of the base powertrain layout. For example, a modular rear drive unit for a hybrid vehicle comprises a torque distributing unit, such as a rear differential, an electric motor-generator, and a gearing arrangement operatively connecting the electric motor-generator with the rear differential. The modular rear drive unit also includes an integrated housing and rear cradle supporting and surrounding the torque distributing unit, the electric motor-generator, and the gearing arrangement. The integrated housing and rear cradle operatively mounts to the vehicle body.

For example, the modular rear drive unit may be for a hybrid vehicle that includes an engine, a transmission driven by the engine, a driveshaft operatively connected with the transmission, and rear half shafts operatively connected to the torque distributing unit. The torque distributing unit may be a rear differential that includes a rotatable differential carrier, and the motor-generator may be positioned at least partially rearward of the rear half shafts and has a motor shaft. The modular rear drive unit further comprises a pinion shaft operatively connectable to the driveshaft, a bevel gear set having a first bevel gear fixed to the pinion shaft, and a second bevel gear fixed to the differential carrier and meshing with the first bevel gear, a cross shaft fixed to and extending forward from the motor shaft generally parallel with the driveshaft, and a reduction gear set having a first transfer gear fixed to the cross shaft, and a second transfer gear fixed to the pinion shaft and meshing with the first transfer gear. The reduction gear set is configured to multiply torque from the cross shaft to the pinion shaft.

A powertrain for a vehicle having a vehicle body, front wheels and rear wheels, comprises an engine with a crankshaft, a first motor-generator drivingly connected to the crankshaft via an endless rotatable device, and a transmission having a transmission input member driven by the crankshaft and a transmission output member. The powertrain includes a driveshaft operatively connected with the transmission output member, and a modular rear drive unit. The modular rear drive unit comprises a torque distributing unit operatively connectable with the driveshaft and configured to transfer torque from the driveshaft to rear half shafts that are connectable to the rear wheels. The modular rear drive unit also includes a second motor-generator drivingly connected to the torque distributing unit and positioned at least partially rearward of the rear half shafts, and a gearing arrangement operatively connecting the electric motor-generator with the torque distributing unit. The modular rear drive unit includes an integrated housing and rear cradle supporting and surrounding the torque distributing unit, the second motor-generator, and the gearing arrangement. The integrated housing and rear cradle directly mounts to the vehicle body.

The modularity of the rear-wheel drive unit enables use in a wide range of rear-wheel drive platforms and engine/transmission combinations, thereby increasing production volumes and lowering costs. Moreover, because the rear-wheel drive unit largely preserves the powertrain layout of some conventional rear-wheel drive vehicles, integration into existing platforms is less complex than if a complete redesign was necessary.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 6 is a schematic illustration in partial cross-sectional and fragmentary plan view of a portion of a third embodiment of a rear drive module for the powertrain of FIG. 1.

FIG. 7 is a schematic illustration in cross-sectional side view of the rear drive module of FIG. 6 taken at lines 7-7 in FIG. 6.

FIG. 8 is a schematic illustration in partial cross-sectional plan view of a portion of a fourth embodiment of a rear drive module for the powertrain of FIG. 1.

FIG. 9 is a schematic illustration in partial cross-sectional plan view of a portion of a fifth embodiment of a rear drive module for the powertrain of FIG. 1.

FIG. 10 is a schematic illustration in partial cross-sectional plan view of a portion of a sixth embodiment of a rear drive module for the powertrain of FIG. 1.

FIG. 11 is a schematic illustration in partial cross-sectional plan view of a portion of a seventh embodiment of a rear drive module for the powertrain of FIG. 1.

DETAILED DESCRIPTION

Figure 1:
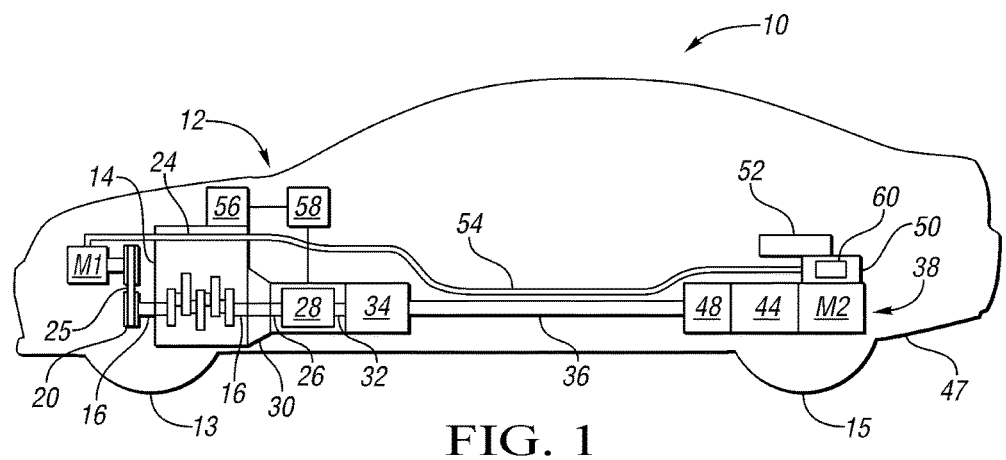
FIG. 1 is a schematic side view illustration of a hybrid powertrain.
Figure 2:
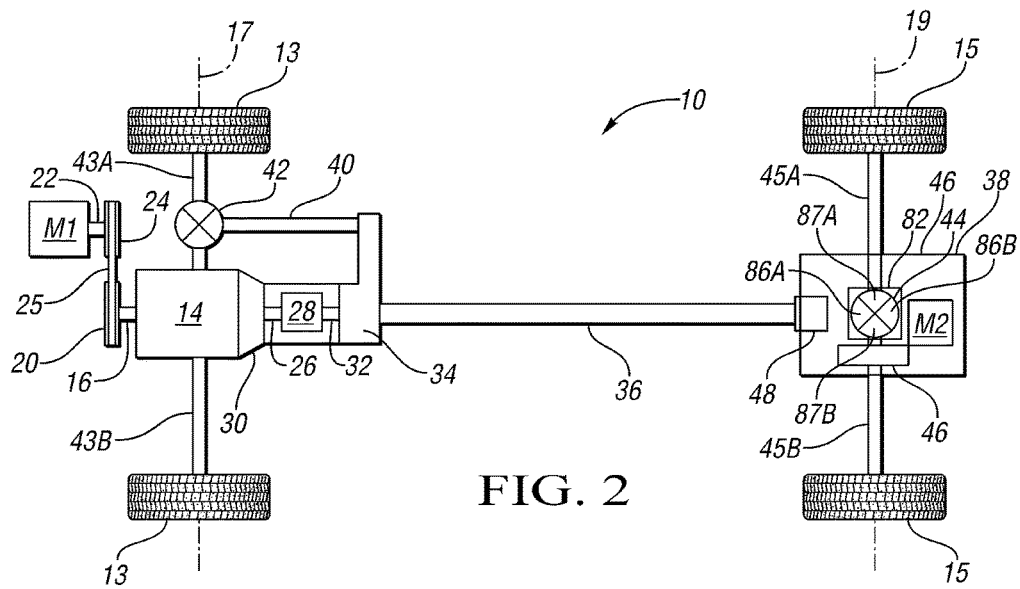
FIG. 2 is a schematic plan view illustration of the hybrid powertrain of FIG. 1.

Referring to the drawings, wherein like reference numbers refer to like components throughout the several views, FIGS. 1 and 2 show a vehicle 10 that has a hybrid powertrain 12. The hybrid powertrain 12 is referred to as a P1-P3 powertrain as it is a rear-wheel drive configuration with a first motor-generator M1 operatively connected with an engine 14 in a belt-alternator-starter (BAS) arrangement in the front of the vehicle 10 near front wheels 13, and with a second motor-generator M2 operatively connected to drive rear wheels 15. The first motor-generator M1 is a relatively high voltage motor, such as a 250 Volt motor. The engine 14 can be an internal combustion engine that is spark ignited or compression ignited. The front wheels 13 rotate about a first axis of rotation 17, and the rear wheels 15 rotate about a second axis of rotation 19. The engine 14 has a crankshaft 16.

The first motor-generator M1 is in driving connection to the engine 14 via a belt-alternator-starter arrangement. The engine 14 is longitudinally-arranged in that the axis of rotation of the crankshaft 16 runs fore and aft in the vehicle 10. As best shown in FIG. 2, the crankshaft 16 has a sprocket 20 mounted thereon, and the motor-generator M1 has a motor shaft 22 with a sprocket 24. The sprockets 20, 24 are engaged with an endless rotatable device, such as a belt or chain 25. In other embodiments, a gear train can be used to drivingly connect the motor-generator M1 and the crankshaft 16.

The crankshaft 16 is connected to an input member 26 of a transmission 28 optionally through a torque converter 30. The transmission 28 can be a dual clutch transmission, a continuously variable transmission, an automatic transmission, a manual transmission, or any other suitable transmission that can establish a variety of gear ratios between the input member 26 and an output member 32. The output member 32 is connected to a transfer case 34 that provides torque to a longitudinally extending driveshaft 36 that can drive the rear wheels 15 through a rear drive unit 38 as described herein. The driveshaft 36 can also be referred to as a propeller shaft or prop shaft. The rear drive unit 38 can be referred to as a modular rear drive unit as it has housing portions that allow it to be assembled and installed to the remainder of the vehicle 10 as a module. Additional rear drive units described herein are also modular. The transfer case 34 is also connected by shaft 40 to a front differential 42. As is understood by those skilled in the art, the transfer case 34 contains a gearing arrangement and a selectable torque-transfer device that can be controlled to direct all of the torque to the rear wheels in a rear-wheel drive mode, or to selectively direct some torque to the front wheels 13 via shaft 40, front differential 42, and front half shafts 43A, 43B, and some torque to the rear wheels 15 via driveshaft 36 and engaged disconnect device 48 in an all-wheel drive mode.

As described in further detail herein, the rear drive unit 38 includes the second motor-generator M2, a rear differential 44, and a gearing arrangement 46 that operatively connects the motor-generator M2 to the rear differential 44. The motor-generator M2 can be an interior permanent magnet 250V motor, or other suitable type of electric motor. The rear drive unit 38 is operatively supported by the vehicle body 47. The rear differential 44 distributes torque to rear half shafts 45A, 45B connected to the rear wheels 15. A disconnect device 48 can be used to selectively disconnect the rear drive unit 38 from the driveshaft 36. The powertrain 12 can be controlled in a variety of operating modes to meet vehicle operating demands in an efficient manner. Moreover, the rear drive unit 38 is configured so that conventional (non-hybrid) or P1 hybrid rear-wheel drive powertrain platforms can be adapted with the rear-wheel drive module to provide a P1-P3 hybrid platform without extensive redesign of the conventional platform. Although the powertrain 12 is shown in a P1-P3 hybrid configuration, the rear drive unit 38 could be adapted to be used with a front wheel-drive P1 hybrid (i.e., a powertrain like powertrain 12 except without a transfer case 34, driveshaft 36, or disconnect device 48, with the transmission output member 32 connected through a final drive to the front differential 42, establishing a P1-P4 configuration.

The hybrid powertrain 12 includes multiple controllers that can be interconnected with one another for coordinated control of the powertrain components. A traction power inverter module (TPIM) 50 is operatively connected to the second motor-generator M2 and to a relatively high voltage battery 52. The TPIM 50 includes a hybrid control processor (HCP) 60 that controls the motor-generator M1 to function as a motor to provide driving torque to the rear wheels 15 through the gearing arrangement 46, rear differential 44, and rear half shafts 45A, 45B. The motor-generator M2 can also be controlled by the TPIM 50 to function as a generator, converting torque to electrical energy stored in the battery 52. The TPIM 50 has power electronics that convert direct current from the battery 52 to alternating current used to power the motor-generator M2.

The TPIM 50 is also operatively connected to the first motor-generator M1, such as by a power cable 54 that carries multi-phase alternating current. The TPIM 50 controls the first motor-generator M1. An engine controller 56 and a transmission controller 58 can be interconnected with the HCP 60. The HCP 60 coordinates functioning of the hybrid powertrain components to achieve desired operating states as described herein. Alternatively, one or more of the controllers 56, 58, and HCP 60 can be combined in a single control module. In another embodiment, a power inverter module (PIM) and an integrated high voltage battery/power inverter module can be used in place of the high voltage battery 52 and the TPIM 50. In still another embodiment, a separate power inverter module can be operatively connected to the first motor-generator M1 at the front of the vehicle, and a high voltage battery and second power inverter module can be operatively connected to the second motor-generator M2 at the rear of the vehicle, with a power cable carrying direct current between the front power inverter module and the rear high voltage battery.

Figure 3:
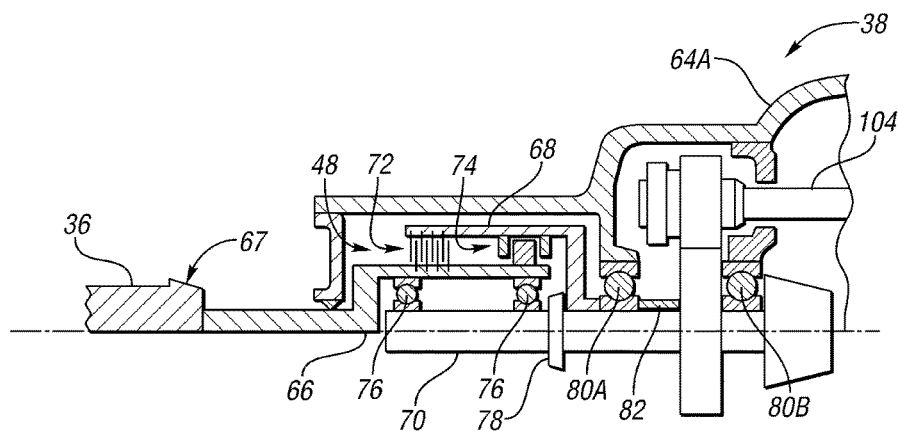
FIG. 3 is a schematic side view illustration in partial cross-sectional and fragmentary view of a portion of a first embodiment of a rear drive module and disconnect device of the hybrid powertrain of FIG. 1.

FIG. 3 shows a portion of the rear drive unit 38. A cradle 62 (shown in FIG. 12 and portions 64B, 64C of a three-piece module housing (shown in FIG. 4) are removed in FIG. 3, with only portion 64A shown. A disconnect device 48 is operable to disconnect the driveshaft 36 of FIG. 1 from the rear differential 44. The disconnect device 48 includes a first portion 66 fixed via a flange device 67 to rotate with the driveshaft 36 and a second portion 68 fixed to rotate with a pinion shaft 70. The disconnect device 48 includes a clutch 72 and a selectable one-way clutch (SOWC) 74. The clutch 72 can be a dog clutch, a sliding clutch, a friction plate clutch, or any other suitable type of clutch. The clutch 72 will be referred to herein as a friction clutch. The SOWC 74 can overrun when the pinion shaft 70 rotates faster than the first portion 66. This disconnects the driveshaft 36 and the engine 14 from the rear drive unit 38. The second motor-generator M2 can be used to power the vehicle 10 in a rear-wheel drive electric-only operating mode when the SOWC 74 overruns in this manner, thus eliminating drag of the engine 14 and driveshaft 36. The SOWC 74 can be selected so that the SOWC 74 is not engaged even when the driveshaft 36 is rotating faster than the pinion shaft 70, such as in reverse. The SOWC 74 is automatically engaged to transfer torque if the pinion shaft 70 is not rotating faster than the driveshaft 36. The friction clutch 72 can be configured to automatically engage when power is removed from its controller/actuator, either as a command from one of the controllers or when the vehicle is turned off by the driver, such as in park. The hybrid control processor 60 can be configured to engage the friction clutch 72 to provide a driving connection between the driveshaft 36 and the rear drive unit 38, such as to provide an engine-driven reverse mode, or when the vehicle 10 is traveling on a downwardly-sloped grade, and drag of the engine 14 is desired to slow the vehicle for grade braking.

The powertrain 12 can be controlled according to stored algorithms that achieve desired operating parameters when the vehicle is travelling in high gears of the transmission 28 to meet customer expectations. For example, if the vehicle 10 is in a highest gear, such as 10th gear if the transmission 28 is a 10-speed transmission (i.e., the lowest numerical gear ratio of the transmission 28), then the HCP 60 can control the motor-generator M2 to function as a motor to add torque to the rear wheels 15 when vehicle operating conditions indicate that additional torque is required, such as by operator depression of an accelerator pedal. Moreover, the HCP 60 executes a stored algorithm that avoids a scenario in which the transmission 28 will downshift when in top gear and a grade incline is encountered. The algorithm prevents this occurrence by maintaining the transmission 28 in a lower gear (i.e., a higher gear ratio, such as 9th gear in a 10-speed transmission) when a state-of-charge of the battery 52 is below a predetermined level of charge. Under these conditions, the motor-generator M2 would not be available to provide additional required torque, and a downshift from 10th gear to 9th gear would be required to maintain vehicle speed on the grade. Instead, the stored algorithm causes the scheduled upshift to 10th gear to be delayed at least until the battery state-of-charge or available power output is above the predetermined level, so that the gear ratio of the transmission 28 (e.g., 9th gear) will be sufficient to provide required torque should a grade incline be encountered.

Referring again to FIG. 3, bearings 76 permit the first portion 66 to rotate relative to the second portion 68 and the pinion shaft 70 when the disconnect device 48 is disconnected. A preload nut 78 helps to axially position the pinion shaft 70 within the rear drive unit 38. Additional bearings 80A, 80B rotatably support the pinion shaft 70 relative to the housing portion 64A.

Figure 4:
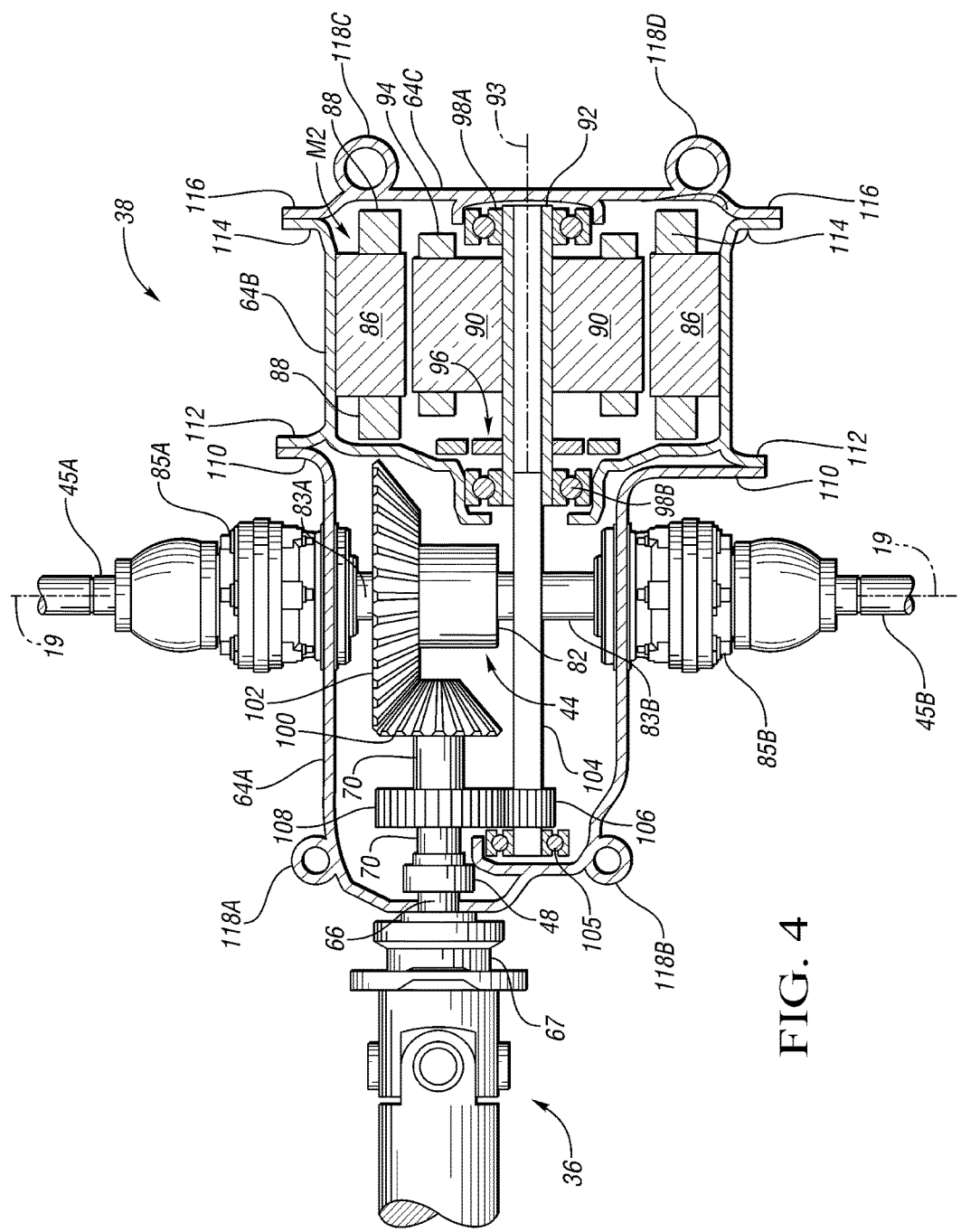
FIG. 4 is a schematic illustration in partial cross-sectional and fragmentary plan view of a portion of the rear drive module of FIG. 3.

FIG. 4 shows the rear drive unit 38 of FIG. 3 in a schematic plan view with the rear differential 44 indicated only by a differential carrier 82. The carrier 82 supports two side gears 87A, 87B (shown in FIG. 2) that are fixed to rotate with respective intermediate axles 83A, 83B that are connected to rotate with the respective rear half shafts 45A, 45B by intermediate axle bearing housing assemblies 85A, 85B. The side gears 87A, 87B are indicated schematically in FIG. 2. Pinion gears 86A, 86B rotate with the differential carrier 82 and mesh with the side gears 87A, 87B in an arrangement that allows a rotational speed difference between the two half shafts 45A, 45B.

The second motor-generator M2 is positioned rearward of the rear half shafts 45A, 45B. The second motor-generator M2 has a stator 86 fixed to the second housing portion 64B. Electrical windings 88 extend from the stator and are operatively connected to the TPIM 50 of FIG. 1. The second motor-generator M2 also has a rotor 90 fixed to a motor shaft 92 to rotate about an axis of rotation 93. End rings 94 protrude from the rotor 90. The second motor-generator M2 can be configured to minimize electrical losses by being a separately excited motor or a switchable element motor. If the second motor-generator M2 is a separately excited motor, it will not have magnets, but will instead have windings on the rotor 90 though which electric current is run to generate a magnetic field. If the second motor-generator M2 is a switchable element motor, it will enable the configuration of the stator windings 88 to be switched to vary the inductance in relation to motor speed for improved efficiency, as is understood by those skilled in the art. For example, the windings 88 can have a switchable element that allows the windings 88 to be switched between a Delta to a Y configuration, or between a 2-turns per winding and a 4-turns per winding configuration, thereby enabling the motor-generator M2 to maximize efficiency as motor speed varies. This can reduce losses in comparison to a motor-generator with magnets or without a switchable element, as such a motor-generator must operate over the entire range of vehicle speeds without modification.

The motor-generator M2 is packaged in the second housing portion 64B. A motor resolver 96 has a portion mounted to the motor shaft 92 and a portion mounted to the second housing portion 64B. The third housing portion 64C mounts to the second housing portion 64B. The motor shaft 92 is supported relative to the housing portion 64C by bearing 98A. An additional bearing 98B supports the motor shaft 92 relative to the second housing portion 64B. The bearings 98A, 98B have a wide stance; that is, they are axially separated by a relatively large distance greater than the axial width of the rotor 90, which minimizes radial tolerance stack of the rotor 90, and thereby increases control of the air gap distance between the rotor 90 and the stator 86.

The rear drive unit 38 includes a bevel gear set that has a first bevel gear 100 fixed to the pinion shaft 70, and a second bevel gear 102 fixed to the differential carrier 82. The bevel gears 100, 102 can be hypoid bevel gears or spiral bevel gears. In the embodiments disclosed herein, unless otherwise indicated, the bevel gears 100, 102 are hypoid gears and are referred to as such. The second hypoid gear 102 meshes with the first hypoid gear 100. The hypoid gear set is a reduction gear set, as it is configured to multiply torque from the first hypoid gear 100 to the second hypoid gear 102. In one embodiment, the hypoid gear set has a gear ratio of 2.77:1.

A cross shaft 104 extends from the motor shaft 92. The cross shaft 104 is fixed to and extends forward from the motor shaft 92 generally parallel with the driveshaft 36. The cross shaft 104 is referred to as a cross shaft because it crosses over (or under) the rear axis of rotation 19, thereby running above or below the differential 44 depending on the position of the motor-generator M2 relative to a trunk floor of the vehicle 10 and the ground. A bearing 105 locates and carries reaction loads of the cross shaft 104. The opposite end of the cross shaft 104 is splined to the motor shaft 92. In addition to the bearings 76 of the disconnect device 48 and the bearings 80A, 80B on the pinion shaft 70 (all shown in FIG. 3), only three additional bearings 98A, 98B, 105 are included in the rear drive unit 38. The transverse arrangement of the motor-generator M2 could accommodate a relatively large motor diameter.

The rear drive unit 38 has a gearing arrangement that is a reduction gear set with a first transfer gear 106 fixed to the cross shaft 104, and a second transfer gear 108 that meshes with the first transfer gear 106 and is fixed to the pinion shaft 70. As used herein, a transfer gear can be a helical gear, a spur gear, or another suitable type of gear. The first transfer gear 106 is smaller in diameter than the second transfer gear 108, so that torque is multiplied from the cross shaft 104 to the pinion shaft 70 through the reduction gear set. In one embodiment, the transfer gear set has a gear ratio of −2.8:1, where gear ratio is the ratio of torque of the pinion shaft 70 to torque of the cross shaft 104.

The housing is a three-piece housing 64A, 64B, 64C. The first housing portion 64A has a flange 110 around its perimeter that bolts or is otherwise secured to a flange 112 of the second housing portion 64B. A flange 114 of the second housing portion 64B is secured to a flange 116 at an outer perimeter of the third housing portion 64C. The connected housing portions 64A, 64B, and 64C are then mounted to the rear cradle 62 of FIG. 12 with various mounting features 118A, 118B, 118C, 118D. The rear cradle 62 then mounts to the vehicle body 47. The mounting features 118A, 118B, 118C, 118D isolate the rear drive unit 38 from the cradle 62 to minimize noise and vibration transfer to the vehicle passenger compartment. Alternatively, the cradle 62 could be made integral with the housing portions 64A, 64B, 64C, without mounts between the housing portions 64A, 64B, 64C and the cradle 62 as discussed with respect to rear drive unit 38B of FIGS. 15 and 16. The rear drive unit 38 and each of the other rear drive units disclosed herein are configured to minimize packaging or other changes to a conventional rear-wheel drive powertrain layout.

The motor-generator M2 is well positioned to enable control of lash between the hypoid gears 100, 102. Specifically, because the rotor 90 is connected with the transfer gear 106 and thereby affects the torque provided to the hypoid gear 100, the second motor-generator M2 can be controlled to adjust torque at the first hypoid gear 100 in response to lash between the hypoid gears 100, 102. The lash can be sensed by torque or speed sensors that provide sensor signals to the HCP 60 or the transmission controller 58. An algorithm can be stored on and executed by the HCP 60 or the transmission controller 58. The stored algorithm determines the torque adjustment required to eliminate lash as determined from sensor signals, and adjusts the torque of the motor-generator M2 accordingly.

The components of the powertrain 12 can be controlled by the engine controller 56, the transmission controller 58, or the HCP 60 to establish various operating modes to efficiently meet operating demands. For example, engine-only operating modes can be established in which the motor-generators M1, M2 are not powered, and the engine 14 is on. In a rear-wheel drive, engine-only operating mode, the engine 14 is on and transmits torque to the rear wheels 15 with the disconnect device 48 engaged to operatively connect the driveshaft 36 to the rear differential 44. An engine-only, all-wheel drive operating mode can also be established when the transfer case 34 is controlled to split the engine torque between the front wheels 13 and the rear wheels 15, by providing torque to the front differential 42 via shaft 40, and torque to the rear differential 44 via driveshaft 36 when disconnect device 48 is engaged.

The powertrain 12 can also be controlled to establish an electric-only, rear-wheel drive operating mode. In an electric-only operating mode, the engine 14 is off, and only the second motor-generator M2 is controlled to function as a motor to provide driving torque. The rear-wheel drive, electric-only operating mode is established when the disconnect device 48 is not engaged, and the motor-generator M2 provides drive torque to the rear wheels 15 through the transfer gears 106, 108, hypoid gears 100, 102, rear differential 44, intermediate axles 83A, 83B, and half shafts 45A, 45B. If the friction clutch 72 is engaged and the transfer case 34 is controlled to direct torque to the front differential 42, then an electric-only, all-wheel drive operating mode is established.

The powertrain 12 can be controlled to establish hybrid operating mode in which the engine 14 is on and the motor-generator M2 is powered as a motor or as a generator as needed to meet changing vehicle operating demands. The HCP 60 is configured to execute a stored algorithm that controls the second motor-generator M2 in conjunction with the transfer case 34 to achieve a desired torque distribution between the front wheels 13 and the rear wheels 15, thereby accomplishing torque vectoring between the front and rear wheels 13, 15.

The motor-generator M1 can also be operated as a motor when the engine 14 is on to add torque to the crankshaft 16, or can be operated as a generator to convert mechanical energy into stored electric energy. The motor-generator M1 can be controlled to function as a motor to start the engine 14, such as when the engine 14 is temporarily stopped during vehicle operation for fuel efficiency, in a stop-start mode.

Figure 5:
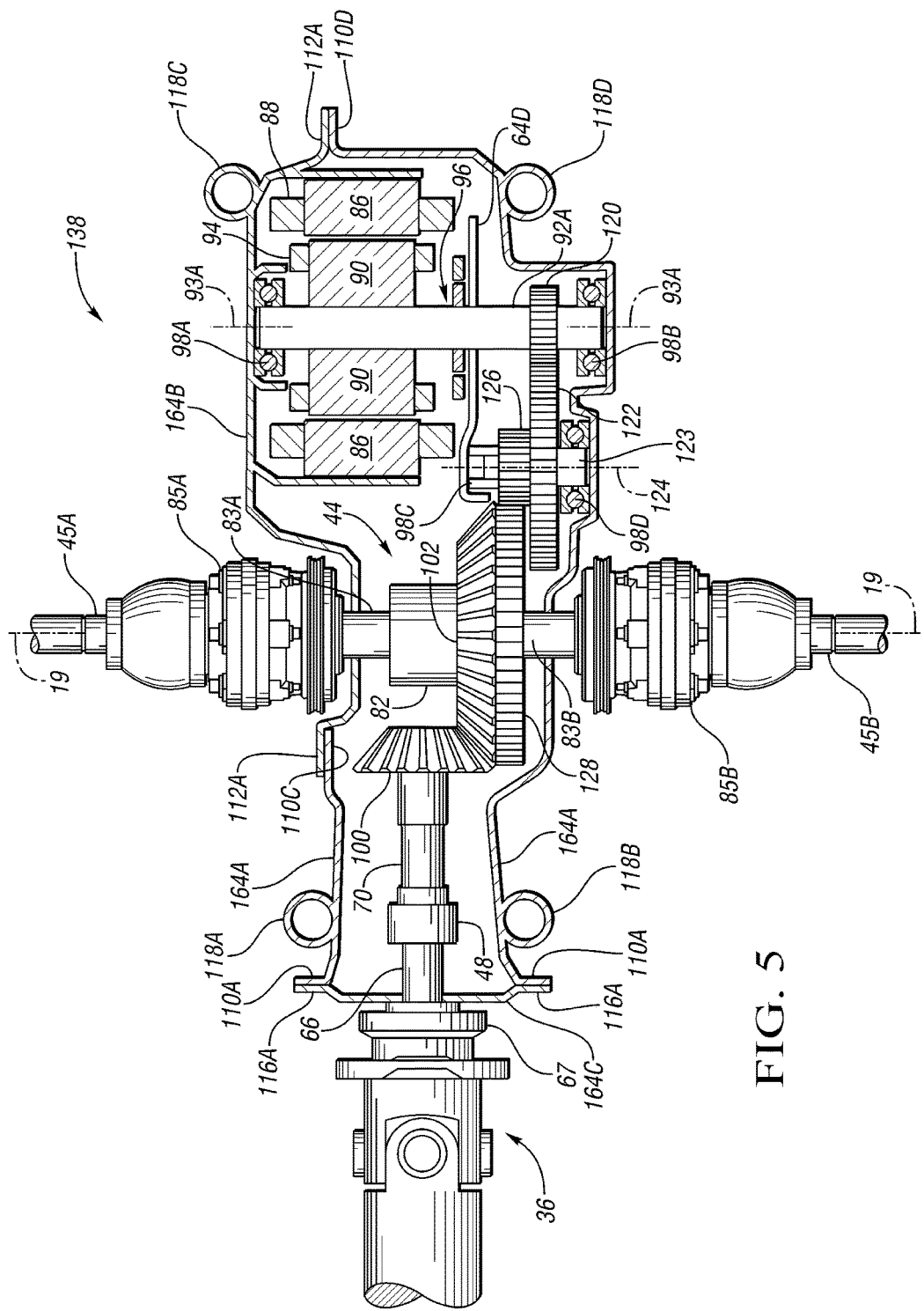
FIG. 5 is a schematic illustration in partial cross-sectional and fragmentary plan view of a portion of a second embodiment of a rear drive module for the powertrain of FIG. 1.

FIG. 5 shows another embodiment of a rear drive unit 138 that can be used in place of rear drive unit 38 in the hybrid powertrain 12 of FIG. 1. In FIG. 5, components that are substantially the same as components in the rear drive unit 38 of FIG. 4 are referred to with like reference numbers. The rear drive unit 138 can be controlled in the same manner to accomplish all of the operating modes discussed with respect to the rear drive unit 38. The motor-generator M2 is arranged with a motor shaft 92A with an axis of rotation 93A that is generally parallel with the axis of rotation 19 of the rear half shafts 45A, 45B and generally perpendicular to the pinion shaft 70 and driveshaft 36.

The rear drive unit 138 has a gearing arrangement that is a transfer gear set with four transfer gears arranged as two reduction gear sets to reduce speed and multiply torque from the motor shaft 92A to the second hypoid gear 102. A first transfer gear 120 is fixed to the motor shaft 92A. A second transfer gear 122 meshes with the first transfer gear 120 and rotates about a transfer axis 124 separate from and parallel with the axes of rotation 93A, 19 of the second motor-generator M2 and the rear half shafts 45A, 45B, respectively. The second transfer gear 122 is larger in diameter that the first transfer gear 120 to multiply torque from the motor shaft 92A to the second transfer gear 122. A third transfer gear 126 is fixed to the second transfer gear 122 or to a transfer shaft 123 that connects the third transfer gear 126 to rotate in unison with the second transfer gear 122 about axis of rotation 124. A fourth transfer gear 128 meshes with the third transfer gear 126 and is fixed to the second hypoid gear 102 to rotate in unison with the second hypoid gear 102. The fourth transfer gear 128 is larger in diameter than the third transfer gear 126 to further multiply torque from the third transfer gear 126 to the fourth transfer gear 128. The fourth transfer gear 128 is a ring gear that can bolted, welded or machined together with the second hypoid gear 102. A powerflow path from the rear half shafts 45A, 45B to the motor-generator M2 during control of the motor-generator M2 as a generator for regenerative braking does not flow through both of the hypoid gears 100 and 102, thus increasing regenerative efficiency as the potential for sliding (and inherent losses) associated with hypoid gearing is avoided.

The transfer shaft 123 with transfer gears 122, 126 mounted thereon can be placed higher or lower than the rear axis of rotation 19. If placed lower than the rear axis of rotation 19, the transfer gear 122 can be positioned within a lower sump formed in the housing portion 164A to provide oil splash for lubrication of the motor-generator M2, similar to the arrangement described with respect to FIG. 14. By placing the transfer gears 120, 122, 126, 128 of the transfer gear set on the same side of the rear drive unit 138 as the second hypoid gear 102, the motor-generator M2 can be packaged on the opposite side of the rear differential 44, nested closely to the rear differential 44.

The rear drive unit 138 has a multi-piece housing with a first housing portion 164A that extends to surround the disconnect device 48, the pinion shaft 70 and to enclose the transfer gears 120, 122, 126, 128 from one side. A second housing portion 164B supports the motor-generator M2 and encloses the rear drive unit 138 from the opposite side. The stator 86 is fixed to the second housing portion 164B. A bearing 98A supports the motor shaft 92A at the second housing portion 164B. A bearing 98B supports the motor shaft 92A at the first housing portion 164A. A third housing portion 164C encapsulates the pinion shaft 70. A peripheral flange 110A of the first housing portion 164A is secured to a peripheral flange 116A of the third housing portion 164C. Flanges 110C, 110D of the first housing portion 164A also meet with and are secured to a peripheral flange 112A of the second housing portion 164B. A split line between the housing portions 164A, 164B is along a longitudinal axis. In other words, the interface of the flanges 110C, 110D and flanges 112A is in a plane perpendicular to the axis of rotation 19 of the rear half shafts 45A, 45B. A bearing (not shown) would support the differential 44 and intermediate shaft 83A relative to the housing portion 164B, and another bearing (not shown) would support the intermediate shaft 83B and transfer gear 128 at the first housing portion 164A.

A center support 64D supports the motor resolver 96 and also supports the transfer shaft 123 and transfer gears 122, 126 at a bearing 98C for rotation about the transfer axis 124. An additional bearing 98D supports the transfer shaft 123 at the housing portion 164A. In some embodiments, the center support 64D is not necessary, as a shaft supporting the transfer gears 122, 126 can extend to the housing portion 164B, and the resolver could be mounted to either of the housing portions 164A, 164B. Elimination of the center support 64D in this manner is dependent upon packaging space within the vehicle 10 for the rear drive unit 138, and the ability to position the motor-generator M2 sufficiently high or low so that the transfer axis 124 is sufficiently above or below the motor-generator M2 to allow a shaft to extend to the housing portion 64B. The bearings 98C, 98D are shown as a "fixed-free" arrangement, as bearing 98B is axially fixed to the housing portion 164A and able to bear axial loads, while bearing 98C is a rolling element bearing, such as a needle bearing that does not bear axial loads, but bears radial loads. The bearings 98A, 98B at the motor shaft 92A could instead be configured in a fixed-free arrangement, so that one of the bearings is a type that can bear axial loading, such as a ball bearing as shown, and the other bearing supports only radial loading, such as a needle bearing similar to bearing 98C.

Figure 12:
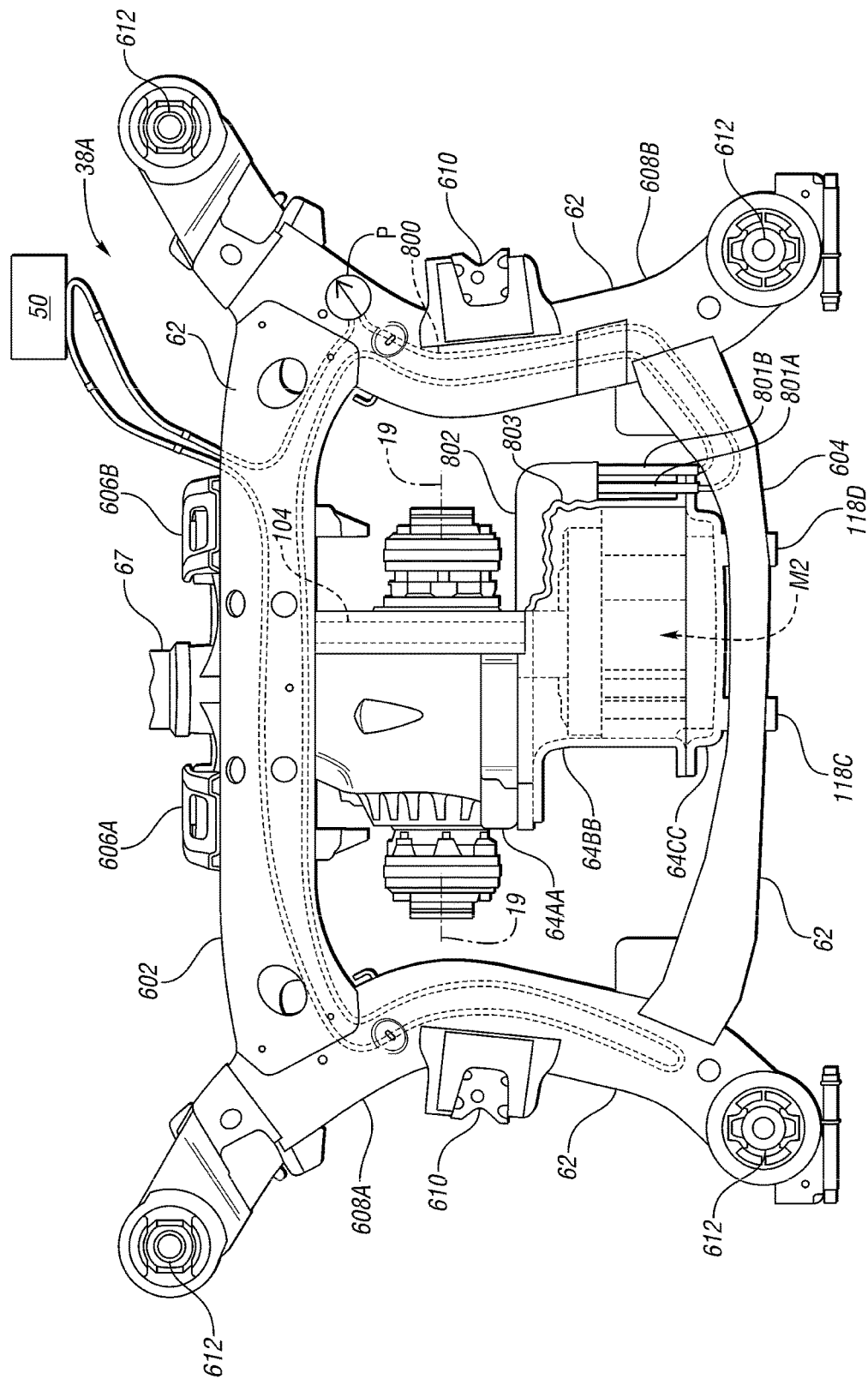
FIG. 12 is a schematic plan view illustration of a rear drive module supported on a cradle.

The connected housing portions 164A, 164B, 164C are mounted to the rear cradle 62 of FIG. 12 with various mounting features 118A, 118B, 118C, 118D. The rear cradle 62 then mounts to the vehicle body 47. The mounting features 118A, 118B, 118C, 118D isolate the rear drive unit 138 from the cradle 62 to minimize noise and vibration transfer to the vehicle passenger compartment. Alternatively, the cradle 62 could be made integral with the housing portions 164A, 164B, 164C without mounts between the housing portions 164A, 164B, 164C and the cradle 62 as described with respect to rear drive unit 38B of FIGS. 15 and 16.

FIGS. 6 and 7 show another embodiment of a rear drive unit 238 that can be used in place of rear drive unit 38 in the hybrid powertrain 12 of FIG. 1. In FIGS. 6 and 7, components that are substantially the same as components in the rear drive unit 38 of FIG. 4 are referred to with like reference numbers. The rear drive unit 238 can be controlled in the same manner and can accomplish all of the operating modes discussed with respect to the rear drive unit 38. The motor-generator M2 is arranged with a motor shaft 92B with an axis of rotation 93B that is generally parallel with the axis of rotation 19 of the rear half shafts 45A. 45B and generally perpendicular to the pinion shaft 70 and driveshaft 36. The rear drive unit 238 includes a chain drive 230 that has a first sprocket 232 fixed to the differential carrier 82, a second sprocket 234 concentric with the motor shaft 92B, and a chain 236 engaged with the first sprocket 232 and the second sprocket 234. The chain 236 provides a reduction gear ratio to multiply torque from the second sprocket 234 to the first sprocket 232. In the embodiment shown, the reduction ratio of torque of the second sprocket 234 to torque of the first sprocket 232 is 1.3:1.

The rear drive unit 238 also includes a gearing arrangement that is a planetary gear set 240 having a carrier member 246 fixed to the second sprocket 234 to rotate with the second sprocket 234, a ring gear 244 fixed to a third housing portion 264C of a stationary housing 264A, 264B, 264C, 264D. The planetary gear set 240 has a sun gear 242 that is fixed to or machined into the motor shaft 92B. A stepped pinion gear 247 is supported by the carrier member 246 to mesh with the ring gear 244 and the sun gear 242. The pinion gears 247 are stepped pinion gears with a large diameter portion 247A meshing with sun gear 242, and a small diameter portion 247B meshing with ring gear 244. The planetary gear set 240 is a stepped pinion planetary gear set, and can be configured to have a reduction gear ratio of torque of the carrier member 246 to torque of the sun gear 242 of between 6:1 and 7.8:1. A powerflow path from the rear half shafts 45A, 45B to the motor-generator M2 during control of the motor-generator M2 as a generator for regenerative braking does not flow through the hypoid gears 100 or 102, thus increasing regenerative efficiency as the potential for sliding between the hypoid gears 100, 102 is avoided.

Placing the planetary gear set 240 and chain drive 230 on the opposite side of the differential 44 than the second hypoid gear 102 allows the motor-generator M2 to be positioned in an area behind the rear half shafts 45A, 45B that is generally open packaging space in existing rear wheel-drive vehicles. The transverse arrangement of the motor-generator M2 could accommodate a relatively large motor diameter, such as, but not limited to, a diameter greater than 200 mm.

The rear drive unit 238 has a multi-piece housing with a first housing portion 264A that extends to surround the disconnect device 48, the pinion shaft 70 and to enclose the differential 44 from the front and sides. A second housing portion 264B supports the motor-generator M2 and encloses the rear drive unit 238 from the rear. The stator 86 is fixed to the second housing portion 264B. A bearing 98B supports the motor shaft 92B at a fourth housing portion 264D. An additional bearing (not shown) supports the motor shaft 92B at the second housing portion 264B. The motor resolver 96 is supported at a central web 264E of the second housing portion 264B. The motor stator 86 is also supported on the central web 264E. A bearing (not shown) supports the second sprocket 234 on the central web 264E.

A peripheral flange 110B of the first housing portion 264A is secured to a peripheral flange 112B of the second housing portion 264B. Peripheral flanges 112B and 112C of the first housing portion 264A are secured to peripheral flanges 116B, 116C of the third housing portion 264C and of the fourth housing portion 264D, respectively.

In order to assemble the rear drive unit 238, the chain drive 230 is first installed with the differential carrier 246. As shown in FIG. 7, the relative positions of the sprockets 232, 234 of the chain drive 230 are held in place by a tray 270 (also referred to as a baffle) that is secured to an inner surface 272 of the first housing portion 264A. The tray 270 is configured to function as a baffle, limiting the amount of sump fluid allowed to come in contact with the chain 236 when the chain 236 is rotating, to limit losses within the rear drive unit 236. The tray 270 is also configured to function as a snubber, which limits the vibration of the span of chain 236 extending along its length. The tray 270 can also function as a fluid guide, allowing fluid entrained by the chain 236 to be carried to an upper sump similar to upper sump 274 of FIG. 14, for re-use as a cooling and lubrication fluid for the motor-generator M2 and its bearings.

The tray 270 can be plastic, and has a narrow width just wider than the width of the sprockets 232, 234. The tray 270 suspends the second sprocket 234 with attached chain 236 rearward of the first housing portion 264A in an appropriate position allowing the motor-generator M2 and second housing portion 264B to then be installed. The planetary gear set 240 and third housing portion 264C can then be installed. A bearing support for the drive sprocket 234 can be installed with the planetary gear set 240 or with the motor-generator M2.

The connected housing portions 264A, 264B, 264C and 264D are then mounted to the rear cradle 62 of FIG. 12 with various mounting features 118A, 118B, and other mounting features not shown. The rear cradle 62 then mounts to the vehicle body 47. The mounting features 118A, 118B isolate the rear drive unit 238 from the cradle 62 to minimize noise and vibration transfer to the vehicle passenger compartment. Alternatively, the cradle 62 could be made integral with the housing portions 264A, 264B, 264C, and 264D without mounts between the housing portions 264A, 264B, 264C, 264D and the cradle 62.

FIGS. 8-11 show other embodiments of rear drive units within the scope of the claimed invention. The housings and bearings of the rear drive units of FIGS. 8-11 are not shown. Components substantially identical to those described with respect to rear drive units 38, 138, and 238 are indicated with like reference numbers. FIG. 8 shows a rear drive unit 338 in which bevel gear 102A is a relatively small diameter hypoid or spiral gear that meshes with the hypoid gear 100 for a right angle drive. The bevel gear 102A is secured to and rotates with a transfer gear 320. The gearing arrangement includes transfer gear 320, and transfer gear 322. Transfer gear 320 is placed above and meshes with the relatively large diameter transfer gear 322 that is secured to and rotates with the differential carrier (not shown) of the rear differential 44. The transfer gear 322 also meshes with a transfer gear 324 that is secured for rotation with a motor shaft 92C of motor-generator M2. The transfer gear 324 is smaller in diameter that the transfer gear 322. Accordingly, torque multiplication occurs from the motor-generator M2 to the transfer gear 322, and also from the transfer gear 320 to the transfer gear 322.

FIG. 9 shows a rear drive unit 438 in which a bevel gear set includes a first hypoid gear 100 secured to the pinion shaft 70 meshing with a relatively small diameter second hypoid gear 102B that is secured for rotation with a motor shaft 92D of the motor-generator M2. A gearing arrangement that is a transfer gear set includes a transfer gear 424 secured to the motor shaft 92D for rotation therewith, and meshing with a larger diameter transfer gear 422 that is secured to the differential carrier (not shown) of the rear differential 44 for rotation therewith. The rear drive unit 438 relies less on the bevel gear set for torque multiplication than other embodiments, instead using the transfer gears 422, 424 of the transfer gear set to accomplish most of the torque multiplication.

FIG. 10 shows a rear drive unit 538 in which a bevel gear set includes a first hypoid gear 100 secured to the pinion shaft 70 meshing with a second hypoid gear 102C that is secured for rotation with a carrier member of a planetary-type rear differential 544. A motor shaft 92E of the motor-generator M2 is a sleeve shaft coaxial with a rear half shaft 45B. A gearing arrangement that is a transfer gear set includes a transfer gear 524 secured to the motor shaft 92E for rotation therewith, and meshing with a larger diameter transfer gear 526 that is mounted to rotate on a transfer shaft 523 supported for rotation by the housing (not shown). Another transfer gear 529 is mounted to rotate with the transfer shaft and meshes with a ring gear 548 of the planetary-type differential 544. The planetary-type differential 544 also has two sun gears 542A, 542B each secured for rotation with a respective one of the rear half shafts 45A, 45B, and two sets of pinion gears 527, 528 each set meshing with one of the sun gears 542A, 542B and with the ring gear 548. The transfer gears 524, 526 accomplish a first stage torque multiplication, and the transfer gear 528 and planetary-type differential 544 accomplish a second stage torque multiplication that may be referred to as out-and-back reduction gearing.

FIG. 11 shows a rear drive unit 638 with a bevel gear set that includes the first hypoid gear 100 secured to the pinion shaft 70 meshing with the second hypoid gear 102 that is secured for rotation with a carrier member (not shown) of the rear differential 44. The motor-generator M2 has a motor shaft 92F secured for rotation with a sun gear member 642 of a planetary gear set 644. A hypoid gear 103 is secured for rotation with a carrier member 646 of the planetary gear set 644. A ring gear 648 of the planetary gear set 644 is grounded to a stationary member, such as a housing (not shown) of the rear drive unit 638. Torque multiplication is achieved from the first hypoid gear 100 to the second hypoid gear 102. Torque multiplication is also achieved from the motor shaft 92F to the bevel gear 103, and then further achieved from the hypoid gear 103 to the hypoid gear 102.

Figure 13:
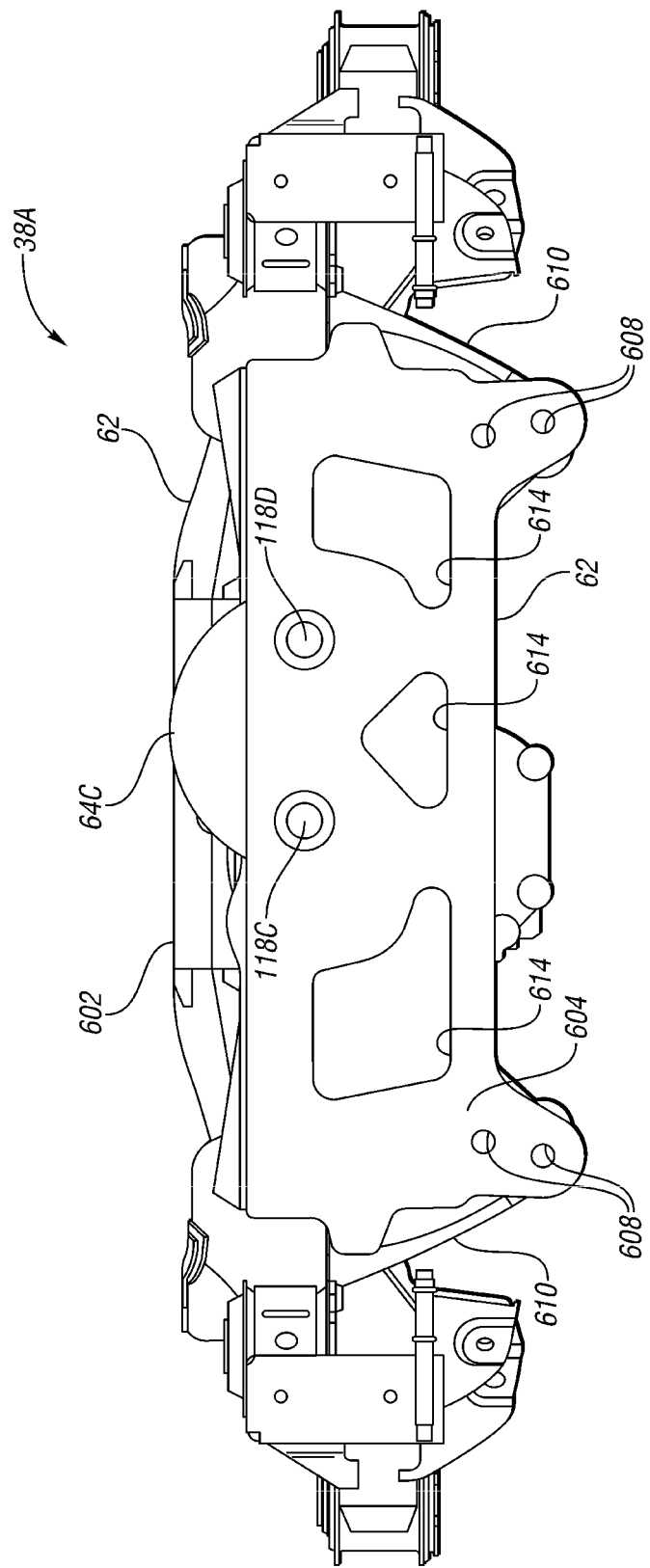
FIG. 13 is a schematic rear view illustration of the rear drive module and cradle of FIG. 12.

FIGS. 12 and 13 show the cradle 62 in greater detail. A rear drive unit 38A is shown from above, and is mounted to the cradle 62. The rear drive unit 38A is identical to rear drive unit 38 except that the cross shaft 104 and hypoid gear 102 (not shown in FIG. 2) are placed on opposite sides of the differential 44 than in FIG. 5 and the housing portions 64A, 64B, 64C are replaced by housing portions 64AA, 64BB, and 64CC. Any of the rear drive units disclosed herein can be mounted to the cradle 62 in a similar manner. The cradle 62 includes a front cross member 602, and a rear cross member 604, with the front cross member 602 being positioned further forward in the vehicle 10 than the rear cross member 604. The cradle 62 includes two side members 608A, 608B to which the cross members 602, 604 extend and are supported on either end. The front cross member 602 extends generally above the first portion 64AA of the three-piece housing of the rear drive unit 38A. The cradle 62 can be a cast Aluminum or Magnesium alloy to help reduce the added weight of hybrid components. The positioning of the cradle 62 and rear drive unit 38A can preserve the positions of a floor pan and a fuel tank of a conventional rear-wheel drive powertrain, enabling relatively easy adaptation to a hybrid platform.

The mounting features 118A, 118B of FIG. 5 are secured to front supports 606A, 606B of the front cross member 602, and the mounting features 118C, 118D are secured to the rear cross member 604. FIG. 13 shows that the rear cross member 604 has suspension attachment points 608 for suspension members 610. The cradle 62 mounts to the vehicle body 47 of FIG. 1 at body mount locators 612. Open areas 614 in the rear cross member 604 decrease the weight of the cradle 62. The cradle 62 is configured to substantially maintain interface points of the driveshaft 36, the rear half shafts 45A, 45B, the suspension attachment points 608, and the body mount locators 612 in common with an existing rear-wheel drive, conventional (non-hybrid) powertrain.

Figure 14:
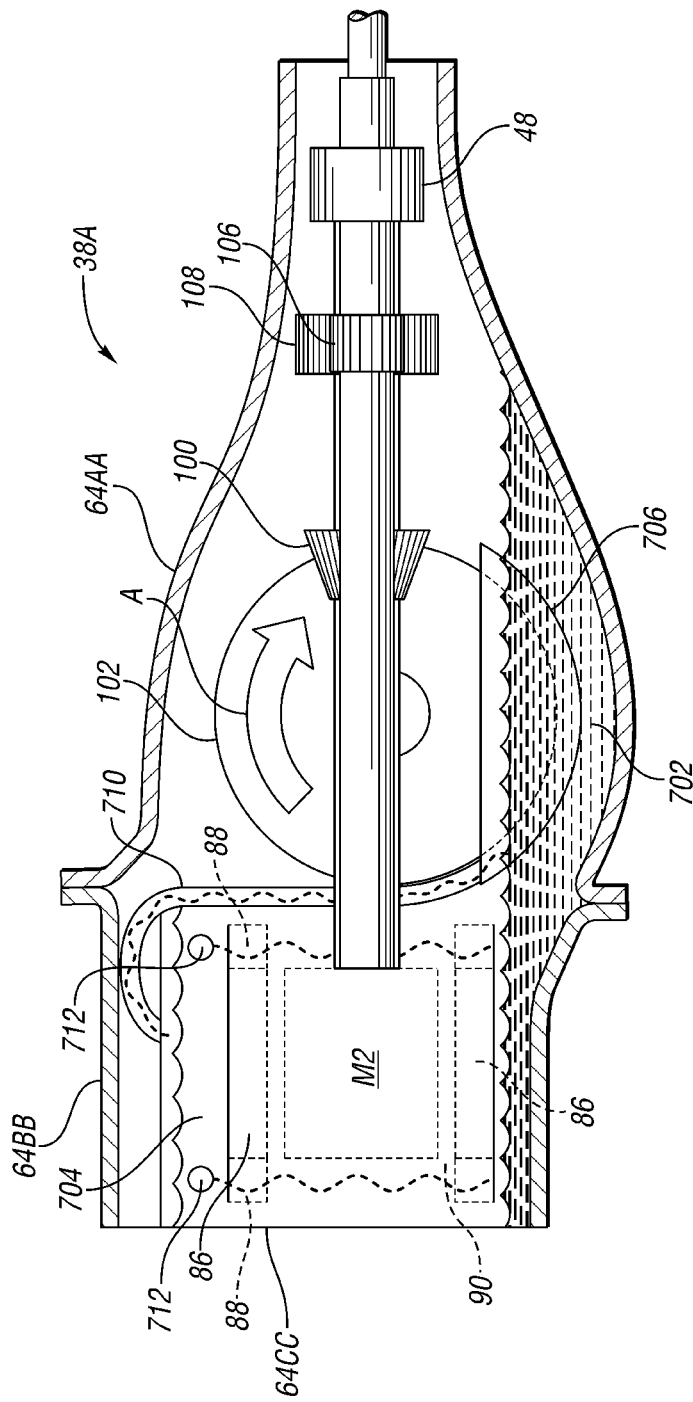
FIG. 14 is a schematic illustration in partial cross-sectional and fragmentary side view of the rear drive module of FIG. 12 with an integrated cooling circuit for the motor and rear differential.

FIG. 14 shows a rear drive unit 38A with housing portions 64AA, 64BB, and 64CC configured to include a lower sump 702 and an upper sump 704. The upper sump 704 is positioned above the stator 86, and rearward of the second hypoid gear 102 to collect lubrication oil thrown within the connected housing portions 64AA, 64BB by the rotating second hypoid gear 102 when the second hypoid gear 102 rotates in a direction of arrow A consistent with forward propulsion of the vehicle 10. A baffle 706 surrounds the lower extent of the second hypoid gear 102, but has openings to allow fluid in the lower sump 702 into the baffle 706 and adjacent to the rotating bevel gear 102. The baffle 706 controls the amount of fluid entrained by the hypoid gear 102 to reduce resistance to rotation, while still allowing the fluid to be flung by the bevel gear 102 into the upper sump 704. An optional guide 710 that can be a cast-in chute or added plastic chute is connected to the baffle 706 and to the upper sump 704 to direct the flung fluid to the upper sump 704. Openings 712 in the upper sump 704 allow the fluid to drain over the motor end windings 88. Additionally, some oil can run onto the end faces of the rotor 90 and be flung off onto the inner diameter of the windings 88. The fluid then drains back to the lower sump 702.

Referring again to FIG. 12, the cradle 62 has a cast-in or drilled coolant passageway 800 that loops through the cradle 62. Ends of the passageway 800 connect to tubes 801A, 801B which in turn connect to a fluid chamber 802. The fluid chamber 802 is adjacent a heat exchange portion 803 of the second housing portion 64BB and extends adjacent to the motor-generator M2, the lower sump 702 of FIG. 14, and the area above the lower sump 702. Together, the passageway 800 and the fluid chamber 802 form a coolant circuit 800, 802. Coolant in the coolant circuit 800, 802 is thus in thermal communication with the oil that cools the rear differential 44 and the rear motor-generator M2. The coolant can be a water-ethylene-glycol (WEG) mixture. The cradle 62 functions as a heat sink and convicting element as the coolant running through the passageway 800 is cooled by the cradle 62 as it travels through the passageway 800 back to the fluid chamber 802. Alternatively, an underbody aeroshield can be connected to the cradle 62 to extend underneath the rear drive unit 38A and form part of the coolant circuit. The TPIM 50 can be supported above the cradle 62, as shown, or elsewhere in the vicinity of the passageway 800 so that the coolant also cools the TPIM 50. The coolant circuit 800, 802 could extend to cool the first motor-generator M1 at the front of the vehicle 10 if the passageway 802 was configured to connect to an additional passage leading to the front of the vehicle 10. Tubes can extend from the cast or drilled passages 800 to the TPIM 50. The coolant circuit 800, 802 can be configured so that only a single pump P is in fluid communication with the coolant to move the coolant through the coolant circuit 800, 802. The pump P is shown supported on the cradle 62.

Figure 15:
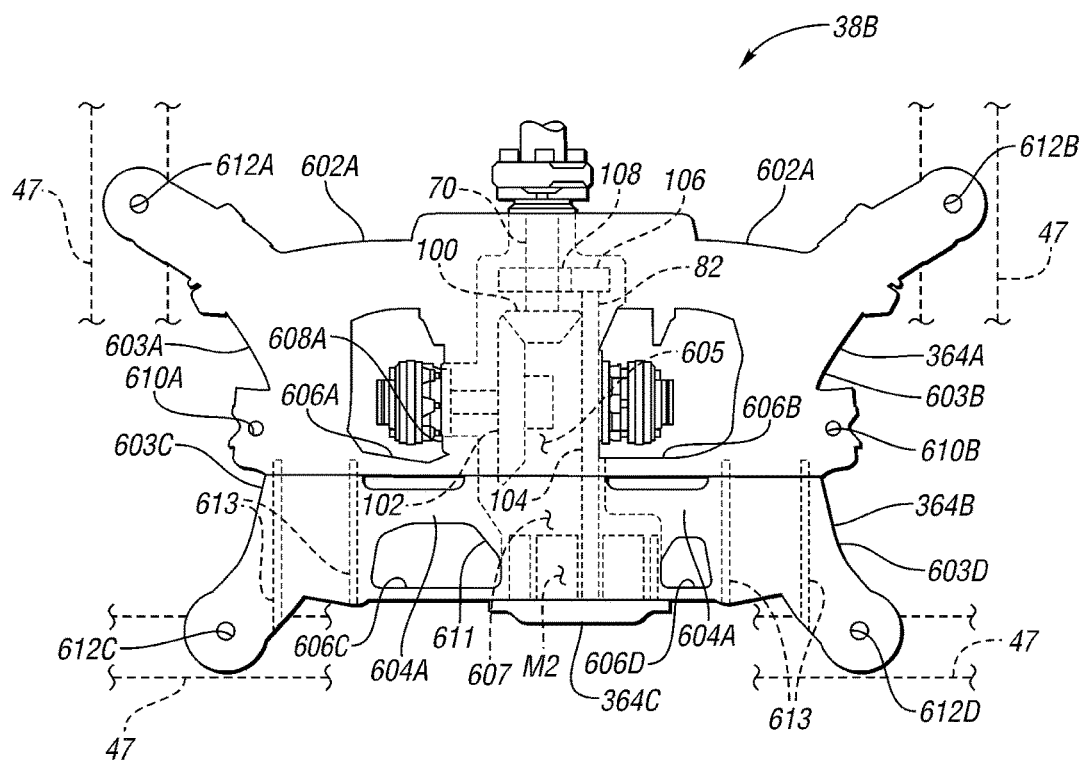
FIG. 15 is a schematic plan view illustration of another embodiment of a rear drive module with an integrated housing and cradle, and showing a vehicle body in fragmentary phantom view.
Figure 16:
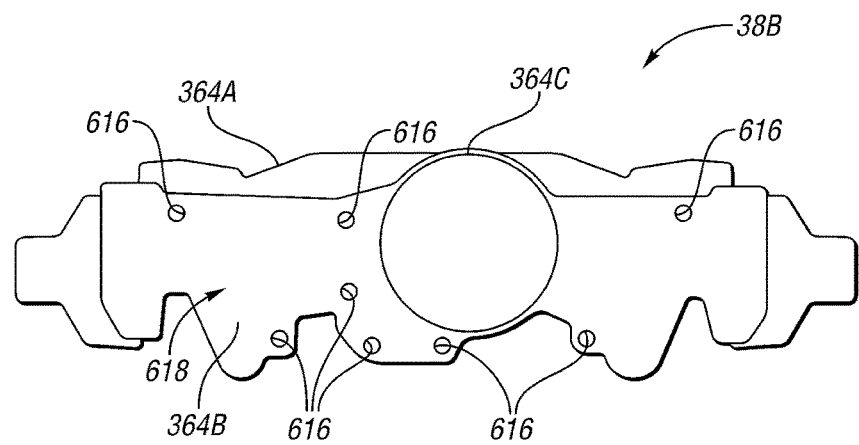
FIG. 16 is a schematic illustration in rear view of the rear drive module with integrated housing and cradle of FIG. 15.

FIGS. 15 and 16 show a rear drive unit 38B that has an integrated housing and cradle 364A, 364B, 364C. The integrated housing and cradle 364A, 364B, 364C is configured to function as a rear cradle supporting an electric motor-generator M2 and the rear differential 82 in an arrangement like that of FIG. 4 with a cross shaft 104 and transfer gears 106, 108. The integrated housing and cradle 364A, 364B, 364C directly mounts to the vehicle body 47 at body mount locators 612A, 612B, 612C, and 612D.

A first portion 364A of the integrated housing and cradle 364A, 364B, 364C supports the rear differential 82 and has an internal cavity 605 containing the gearing 100, 102, 106, 108 and the cross shaft 104. The first portion 364A includes a front cross member 602A, and side members 603A, 603B, as well as supplemental cross members 606A, 606B that extend from a central portion 608A to the side members 603A, 603B. The first portion 364A includes body mount locators 612A, 612B and suspension mount features 610A, 610B where the suspension mounts to the first portion 364A. The first portion 364A is a unitary component, and can be a cast Aluminum or Magnesium alloy, or another suitable material.

A second portion 364B of the integrated housing and cradle 364A, 364B, 364C is configured to be secured to the first portion 364A and supports the electric motor-generator M2 in a cavity 607 that aligns with the cavity 605. The split line (i.e., the interface of the first portion 364A and the second portion 364B) allows the gearing 100, 102, 106, 108, the cross shaft 104, and the motor-generator M2 to be assembled within the respective portions 364A, 364B before the portions 364A, 364B are secured to one another. The cross shaft 104 extends into the cavity 605 and connects to the motor-generator M2. The second portion 364B includes a rear cross member 604A, side members 603C, 603D, as well as supplemental cross members 606C, 606D that extend from a central portion 611 to the side members 603C, 603D. The second portion 364B also includes body mount locators 612C, 612D where the second portion 364B mounts to the vehicle body 47, shown in phantom. The second portion 364B is a unitary component, and can be a cast Aluminum or Magnesium alloy, or another suitable material.

Drilled or cast passages 613 allow threaded bolts 616 (bolt heads shown in FIG. 16) to extend from a rear face 618 of the second portion 364B to the first portion 364A. The third housing portion 364C is a motor cover that is secured to the second housing portion 364B by bolts or otherwise to enclose the motor-generator M2.

Both the first housing portion 364A and the third portion 364C include body mount locators 612A, 612B, 612C, 612D at which the integrated housing and cradle 364A, 364B, 364C is connected to the vehicle body 47. The positioning of the integrated housing and cradle 364A, 364B, 364C can preserve the position of a floor pan and a fuel tank on a conventional rear-wheel drive powertrain, enabling relatively easy adaptation to a hybrid platform.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A modular rear drive unit for a hybrid vehicle having a vehicle body, the modular rear drive unit comprising:
    a torque distributing unit providing differential action;
    an electric motor-generator;
    a gearing arrangement operatively connecting the electric motor-generator with the torque distributing unit;
    an integrated housing and rear cradle supporting and surrounding the torque distributing unit, the electric motor-generator, and the gearing arrangement;
    wherein the integrated housing and rear cradle operatively mounts to the vehicle body;
    wherein the integrated housing and rear cradle includes a first portion and a second portion;
    wherein the first portion supports the torque distributing unit
    wherein the second portion is secured to the first portion and supports the electric motor-generator; and
    wherein the first portion includes a central portion, a side member, and a front cross member connecting the central portion to the side member.

2. The modular rear drive unit of claim 1, wherein the integrated housing and rear cradle includes body mount locators at which the integrated housing and rear cradle directly mounts to the vehicle body.

3. The modular rear drive unit of claim 2, wherein some of the body mount locators are at the first portion, and some of the body mount locators are at the second portion.

4. The modular rear drive unit of claim 1, wherein the first portion has a first internal cavity; and
    wherein the second portion has a second internal cavity aligned with the first portion.

5. The modular rear drive unit of claim 4, further comprising:
    a cross shaft connected to the electric motor-generator; and
    wherein the gearing arrangement and the cross shaft are in the first internal cavity.

6. The modular rear drive unit of claim 5, wherein the electric motor-generator is in the second internal cavity.

7. The modular rear drive unit of claim 1, wherein the first portion includes a supplemental cross member adjacent to the second portion.

8. The modular rear drive unit of claim 1, wherein passages extend from a rear face of the second portion into the first portion.

9. The modular rear drive unit of claim 8, wherein the passages are threaded and are configured to receive fasteners.

10. The modular rear drive unit of claim 1, further comprising:
    suspension mount features attached to the integrated housing and rear cradle.

11. A modular rear drive unit for a hybrid vehicle having a vehicle body, the modular rear drive unit comprising:
    a torque distributing unit providing differential action;
    an electric motor-generator;
    a gearing arrangement operatively connecting the electric motor-generator with the torque distributing unit;
    an integrated housing and rear cradle supporting and surrounding the torque distributing unit, the electric motor-generator, and the gearing arrangement;
    wherein the integrated housing and rear cradle operatively mounts to the vehicle body;
    wherein the integrated housing and rear cradle includes a first portion and a second portion;
    wherein the first portion supports the torque distributing unit;
    wherein the second portion is secured to the first portion and supports the electric motor-generator; and
    wherein the second portion includes a central portion, a side member, and a rear cross member connecting the central portion to the side member.

12. The modular rear drive unit of claim 11, wherein the second portion includes a supplemental cross member connecting the central portion to the side member.

13. A hybrid vehicle comprising:
    a vehicle body;
    a modular rear drive unit including:
        a torque distributing unit providing differential action;
        an electric motor-generator;
        a gearing arrangement operatively connecting the electric motor-generator with the torque distributing unit;
        an integrated housing and rear cradle supporting and surrounding the torque distributing unit, the electric motor-generator, and the gearing arrangement;
    wherein the integrated housing and rear cradle operatively mounts to the vehicle body;
    wherein the integrated housing and rear cradle includes a first portion and a second portion;
    wherein the first portion supports the torque distributing unit;
    wherein the second portion is secured to the first portion and supports the electric motor-generator;
    wherein the housing further comprises a third portion secured to the second portion and at least partially enclosing the electric motor-generator;
    wherein the vehicle includes an engine, a transmission driven by the engine, a driveshaft operatively connected with the transmission, and rear half shafts operatively connected to the torque distributing unit;
    wherein the torque distributing unit is a rear differential that includes a rotatable differential carrier; wherein the motor-generator is positioned at least partially rearward of the rear half shafts and has a motor shaft, and the modular rear drive unit further comprising:
    a pinion shaft operatively connectable to the driveshaft;
    a bevel gear set having a first bevel gear fixed to the pinion shaft, and a second bevel gear fixed to the differential carrier and meshing with the first bevel gear;
    a cross shaft fixed to and extending forward from the motor shaft generally parallel with the driveshaft;

a reduction gear set having a first transfer gear fixed to the cross shaft, and a second transfer gear fixed to the pinion shaft and meshing with the first transfer gear; and wherein the reduction gear set is configured to multiply torque from the cross shaft to the pinion shaft.

\* \* \* \* \*